(12) United States Patent
Schreuder et al.

(10) Patent No.: US 9,228,597 B2
(45) Date of Patent: Jan. 5, 2016

(54) METHODS AND APPARATUS FOR ADJUSTING ACTUATOR OUTPUT TORQUES

(71) Applicant: Emerson Process Management, Valve Automation., Inc, Waller, TX (US)

(72) Inventors: Edwin Schreuder, Enschede (NL); Harry Hobert, Hengelo (NL)

(73) Assignee: EMERSON PROCESS MANAGEMENT, VALVE AUTOMATION, INC., Houston, TX (US)

( * ) Notice: Subject to any disclaimer, the term of this patent is extended or adjusted under 35 U.S.C. 154(b) by 379 days.

(21) Appl. No.: 13/887,079

(22) Filed: May 3, 2013

(65) Prior Publication Data

US 2014/0326129 A1    Nov. 6, 2014

(51) Int. Cl.
  *F15B 15/06*  (2006.01)
  *F15B 15/22*  (2006.01)
  *F16K 31/163*  (2006.01)

(52) U.S. Cl.
  CPC ............. *F15B 15/226* (2013.01); *F15B 15/065* (2013.01); *F16K 31/1635* (2013.01); *F15B 2211/76* (2013.01); *Y10T 29/49229* (2015.01)

(58) Field of Classification Search
  CPC ... F15B 15/065; F15B 15/226; F16K 31/1635
  USPC .......................................... 92/133, 85 A, 136
  See application file for complete search history.

(56) References Cited

U.S. PATENT DOCUMENTS

| | | | | |
|---|---|---|---|---|
| 1,939,912 | A | * | 12/1933 | McNeal ......................... 251/337 |
| 3,727,523 | A | * | 4/1973 | Gulick ......................... 92/130 R |
| 3,943,830 | A | * | 3/1976 | Sugiura .............................. 92/63 |
| 4,248,104 | A | * | 2/1981 | Wood, III ......................... 74/569 |
| 5,492,050 | A | * | 2/1996 | Holtgraver ......................... 92/74 |
| 7,178,787 | B2 | * | 2/2007 | Gilbert et al. ................. 251/337 |
| 8,567,752 | B2 | * | 10/2013 | ter Horst et al. ................. 251/31 |
| 2014/0260953 | A1 | * | 9/2014 | Jaccoby et al. ................. 92/132 |

FOREIGN PATENT DOCUMENTS

| | | |
|---|---|---|
| DE | 102004056515 | 6/2006 |
| DE | 202006006407 | 10/2007 |

OTHER PUBLICATIONS

Patent Cooperation Treaty, "International Search Report," issued in connection with PCT Application No. PCT/US2014/036099, mailed on Sep. 17, 2014, 4 pages.
Patent Cooperation Treaty, "Written Opinion," issued in connection with PCT Application No. PCT/US2014/036099, mailed on Sep. 17, 2014, 6 pages.
Patent Cooperation Treaty, "International Preliminary Report on Patentability", issued in connection with PCT Patent Application No. PCT/US2014/036099, issued on Nov. 3, 2015, 7 pages.

* cited by examiner

*Primary Examiner* — Thomas E Lazo
(74) *Attorney, Agent, or Firm* — Hanley, Flight & Zimmerman, LLC

(57) ABSTRACT

Methods and apparatus for changing actuator output torques are disclosed. An example method includes decoupling a first end cap from a body of an actuator. A first spring assembly is positioned within a first outer chamber defined by the first end cap and the body. A first end of the first spring assembly is positioned adjacent a surface of a first piston. A second end of the first spring assembly is positioned adjacent the first end cap when the first end cap is coupled to the body. The method includes positioning a first spacer within the first outer chamber and coupling the first end cap to the body. The first spacer changes a distance between the first and second ends of the first spring assembly when the first end cap is coupled to the body to change an output torque of the actuator.

27 Claims, 15 Drawing Sheets

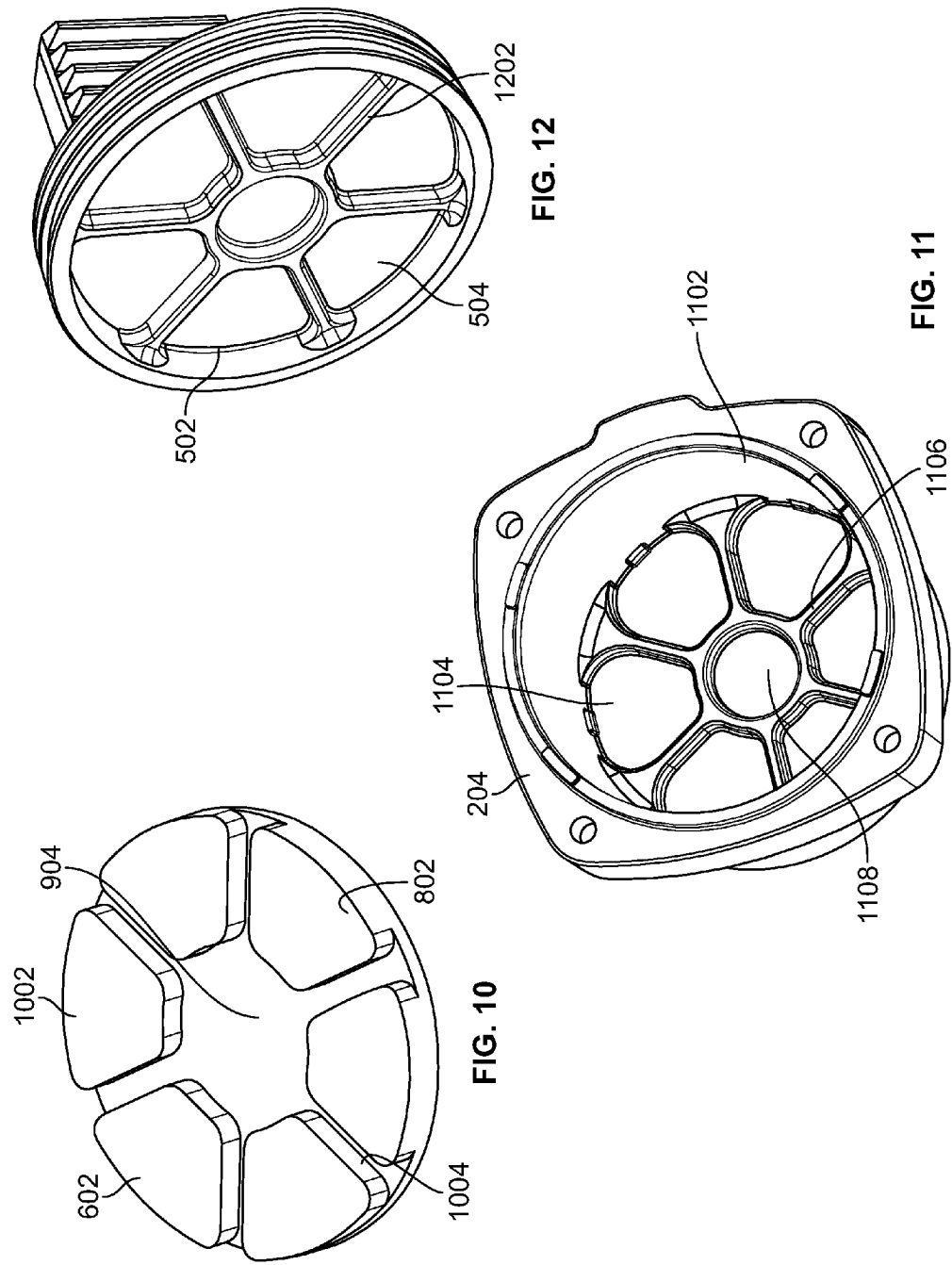

METHODS AND APPARATUS FOR ADJUSTING ACTUATOR OUTPUT TORQUES

FIELD OF THE DISCLOSURE

This patent relates generally to actuators and, more particularly, to methods and apparatus for changing actuator output torques.

BACKGROUND

Process control plants or systems often employ rotary valves such as butterfly valves to control the flow of process fluids. In general, rotary valves include a fluid flow control member disposed in a fluid flow path between an inlet and an outlet of the rotary valve. The fluid flow control member is coupled to a shaft that extends from the valve body and is coupled to an actuator (e.g., a pneumatic actuator, a hydraulic actuator, etc.). The actuator rotates the valve shaft in a first direction and a second direction opposite the first direction to control fluid flow through the valve.

SUMMARY

An example method includes decoupling a first end cap from a body of an actuator. A first spring assembly is positioned within a first outer chamber defined by the first end cap and the body. A first end of the first spring assembly is positioned adjacent a surface of a first piston. A second end of the first spring assembly is positioned adjacent the first end cap when the first end cap is coupled to the body. The method includes positioning a first spacer within the first outer chamber and coupling the first end cap to the body. The first spacer changes a distance between the first and second ends of the first spring assembly when the first end cap is coupled to the body to change an output torque of the actuator.

An example method includes positioning a first spacer within a first outer chamber and positioning a first spring assembly within the first outer chamber. The first outer chamber is defined by a first end cap and a body of an actuator. A first end of the first spring assembly is positioned adjacent a surface of a first piston. A second end of the first spring assembly is positioned adjacent the first end cap when the first end cap is coupled to the body. The method includes coupling the first end cap to the body. The first spacer changes a distance between the first and second ends of the first spring assembly when the first end cap is coupled to the body to change an output torque of the actuator.

BRIEF DESCRIPTION OF THE DRAWINGS

FIG. 10 depicts an isometric view of an example spacer that can be used to implement the examples disclosed herein.
FIG. 11 depicts an end cap of the rotary actuator of FIG. 2.
FIG. 12 depicts a piston of the rotary actuator of FIG. 2.

DETAILED DESCRIPTION

Figure 1:
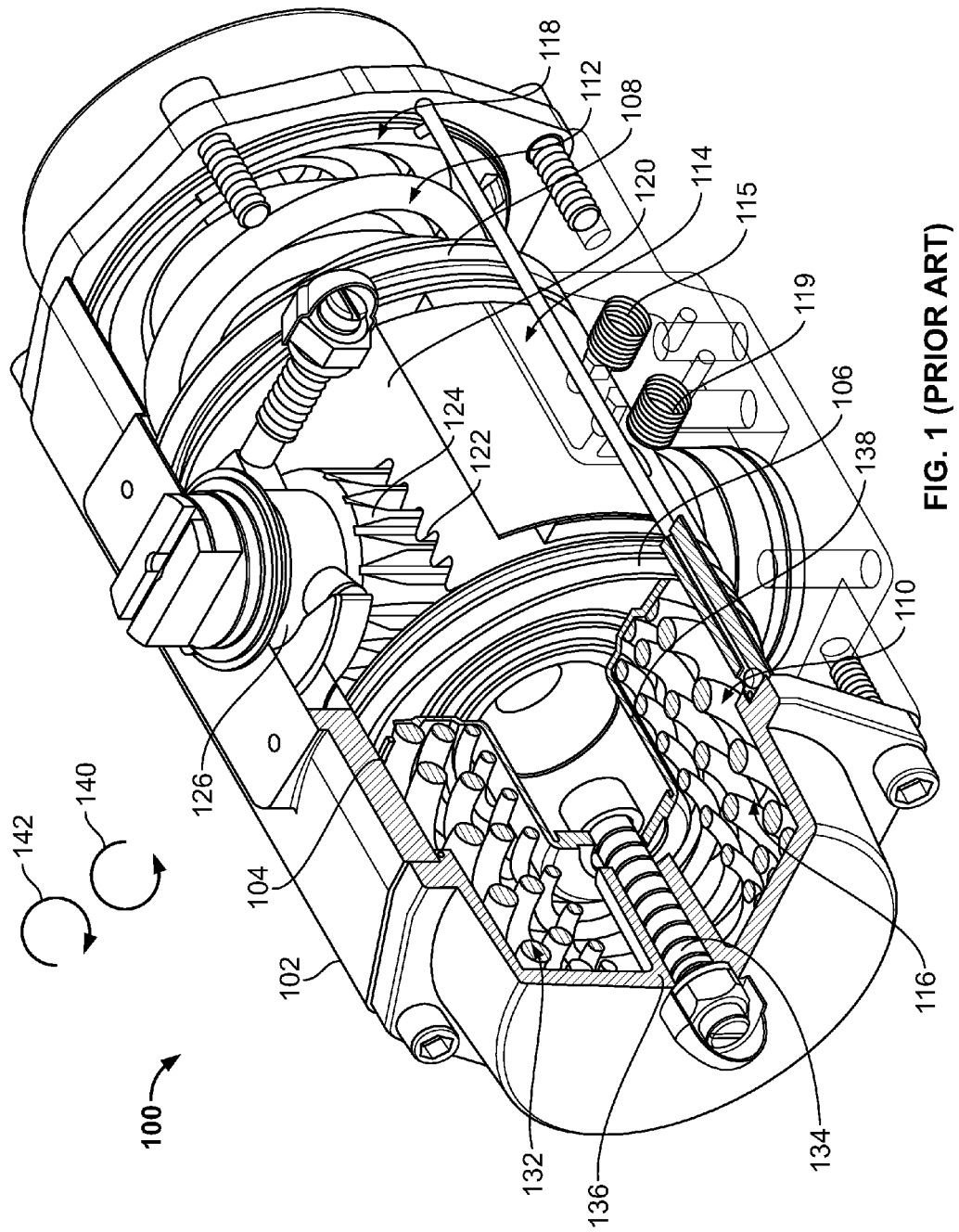
FIG. 1 shows a known double-acting rotary valve actuator.
Figure 2:
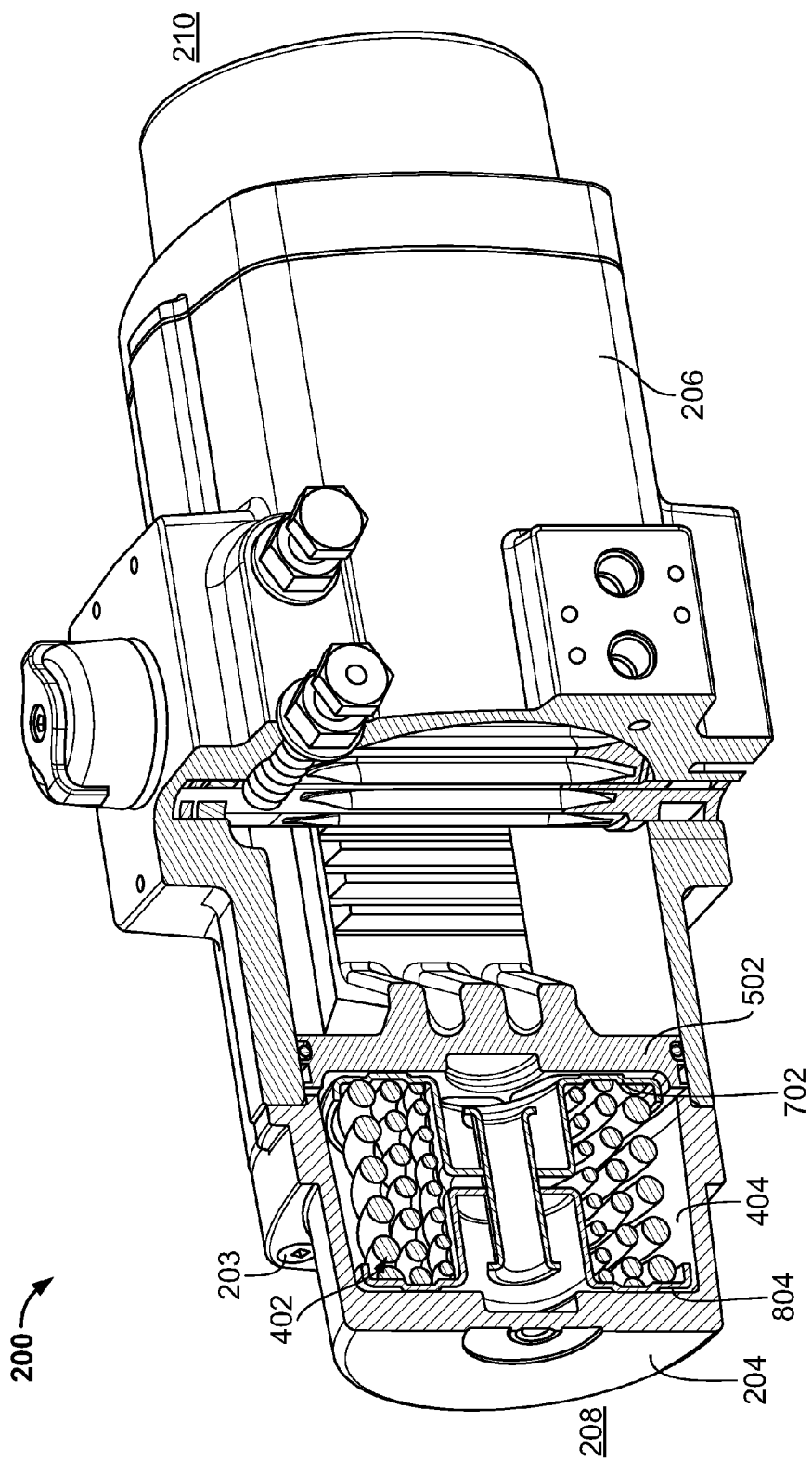
FIGS. 2-9 depict an example process of changing an output torque value of a rotary actuator.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

The examples disclosed herein relate to torque output modifying spacers that enable the output torque of an actuator to be easily and safely changed without disassembling and reassembling a spring assembly of the actuator. Specifically, using the examples disclosed herein, the spring torque output can be modified by positioning one or more example spacers within the housing of the actuator. In contrast to the examples disclosed herein, to change the spring torque output of some known actuators, a spring assembly is disassembled and springs are added and/or removed therefrom. Once the desired spring force is obtained, the spring assembly is reassembled and positioned within the actuator.

FIG. 1 shows a known rotary valve actuator (e.g., a rack and pinion actuator) 100 that can be used to control the position of a fluid flow control member of a rotary valve, for example. The actuator 100 includes a body 102 defining a chamber 104 within which first and second pistons 106, 108 and first and second spring assemblies 110, 112 are positioned. The pistons 106, 108 separate the chamber 104 into an inner chamber 114 fluidly coupled to a first port 115 and outer chambers 116, 118 fluidly coupled to a second port 119. In some examples, the pistons 106, 108 include extensions 120 having racks 122 that engage and/or mesh with a pinion 124 of a drive shaft 126. The spring assemblies 110, 112 bias the pistons 106, 108 toward the drive shaft 126 and urge the rack 122 to move the pinion 124, the drive shaft 126 and a fluid flow control member of the rotary valve to a fail-safe position, for example.

The spring assemblies 110, 112 are configured to provide a spring torque output for the actuator 100. In some examples, the spring torque output may be changed by removing the spring assemblies 110, 112 from the body 102 and disassembling them to enable springs 132 to be added or removed. In some examples, the spring assemblies 110, 112 are disassembled by removing a fastener 134 that telescopically couples plates 136, 138 of the spring assemblies 110, 112 and carefully allowing the springs 132 to decompress and/or the plates 136, 138 to move away from one another. Once the spring force of the spring assemblies 110, 112 is adjusted to provide the desired spring torque output for the actuator 100, the spring assemblies 110, 112 may be reassembled and positioned within the body 102.

In operation, the pistons 106, 108 are moved rectilinearly within the body 102 causing the racks 122 to interact with the pinion 124 and rotate the drive shaft 126 in directions generally indicated by arrows 140 or 142. For example, to rotate the drive shaft 126 in the direction generally indicated by arrow (e.g., counterclockwise) 140, pressure within the inner chamber 114 is increased to overcome the force applied from the outer chambers 116, 118. Force may be applied from the outer chambers 116, 118 by the spring assemblies 110, 112 and/or pressure within the outer chambers 116, 118. To rotate the drive shaft 126 in the direction generally indicated by arrow (e.g., clockwise) 142, the pressure within the outer chambers 116, 118 is increased and/or the pressure within the inner chamber 114 is decreased such that the force acting on the pistons 106, 108 from the outer chambers 116, 118 is greater than the force acting on the pistons 106, 108 from the inner chamber 114. In some examples, moving the pistons 106, 108 toward the drive shaft 126 moves the fluid flow control member toward a closed position and moving the pistons 106, 108 away from the drive shaft 126 moves the flow control member toward an open position.

Figure 3:
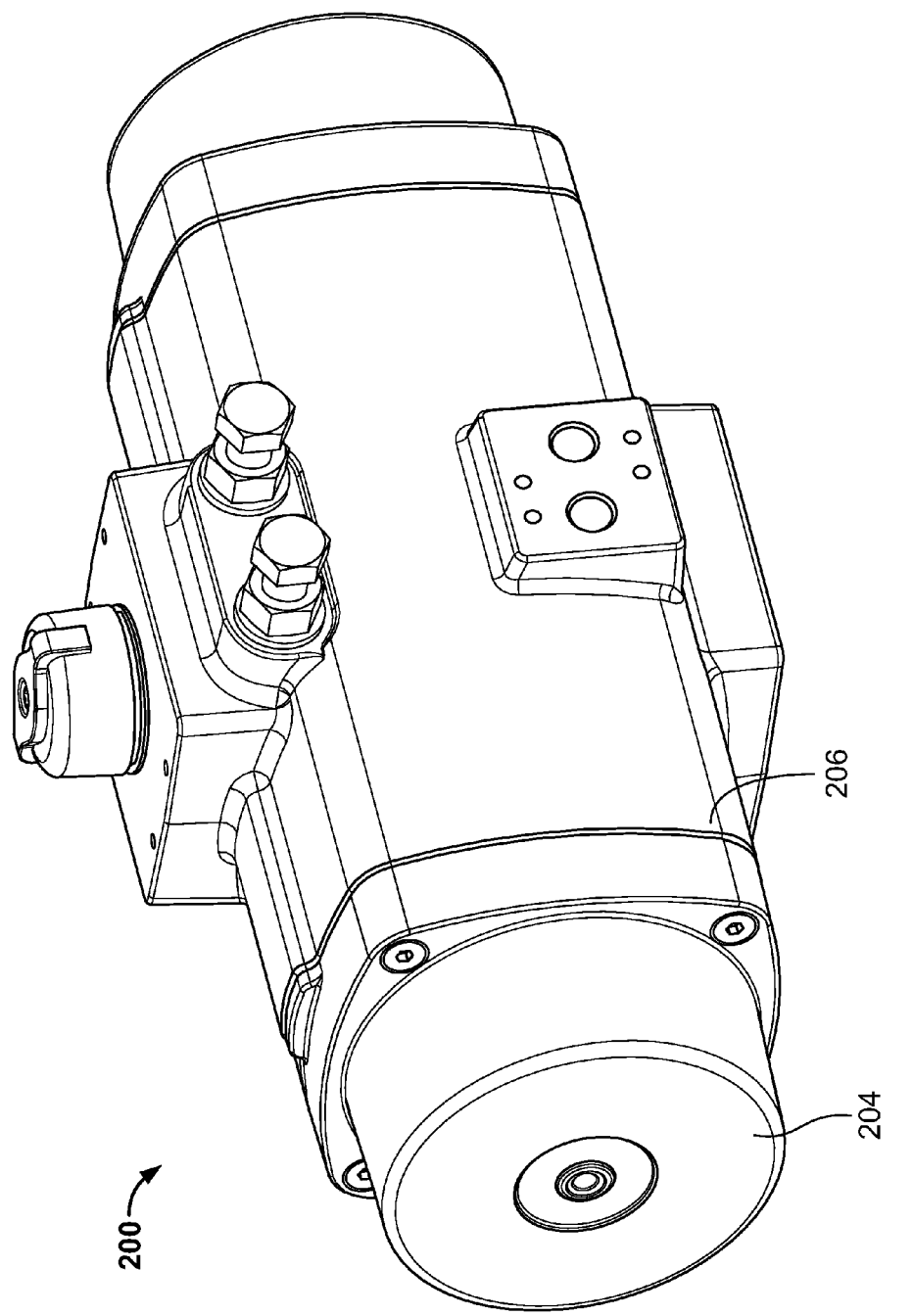
Figure 4:
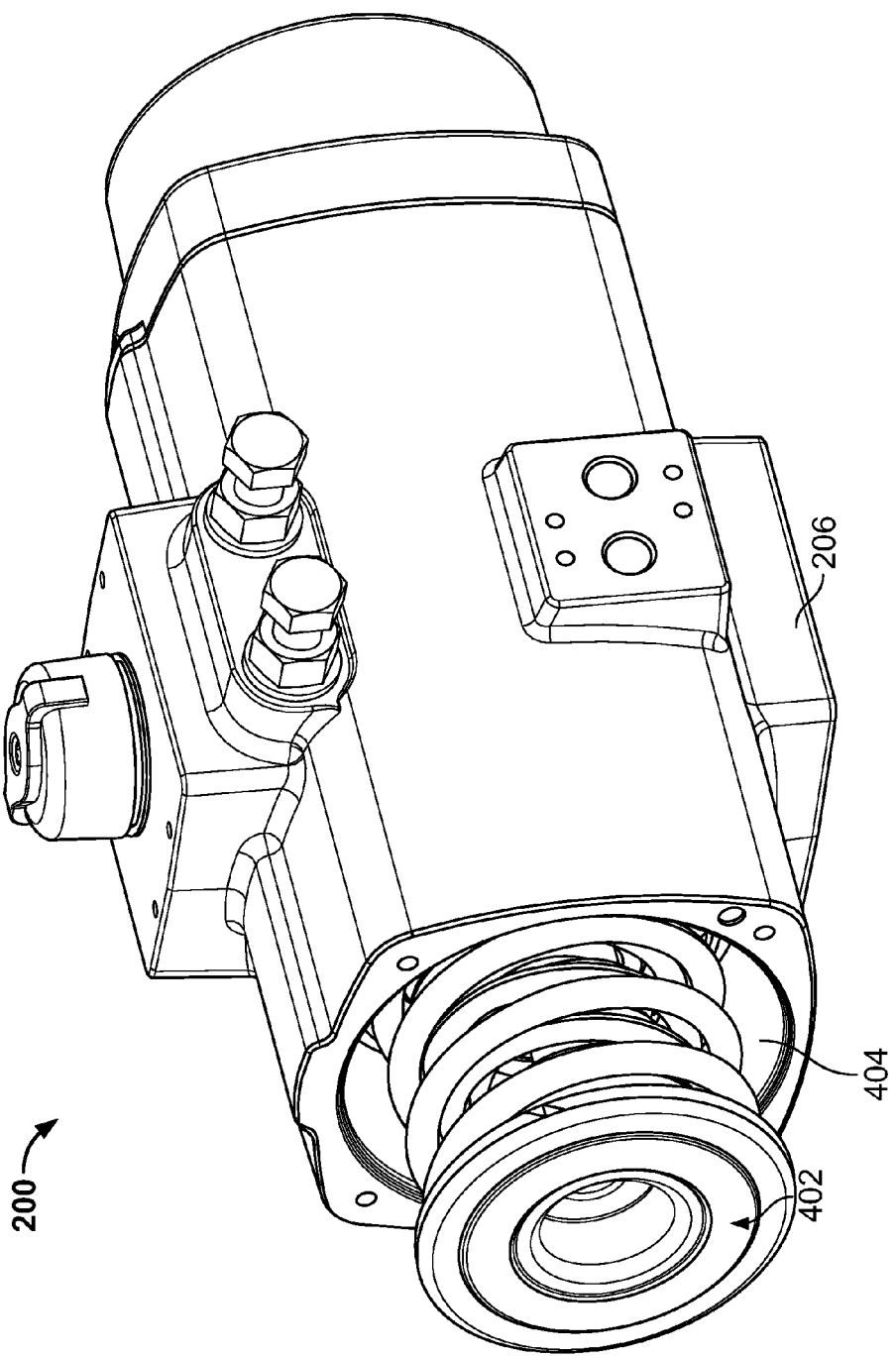

FIGS. 2-9 depict an example process of changing a spring output torque value of an actuator 200. In some examples, to change the output toque of the actuator 200, fasteners 203 and an end cap 204 are removed from an actuator body 206 to provide access to an outer chamber 404 of the body 206 and spring assembly 402 positioned therein. FIG. 3 shows the fasteners 203 removed and FIG. 4 shows the end cap 204 removed.

Figure 5:
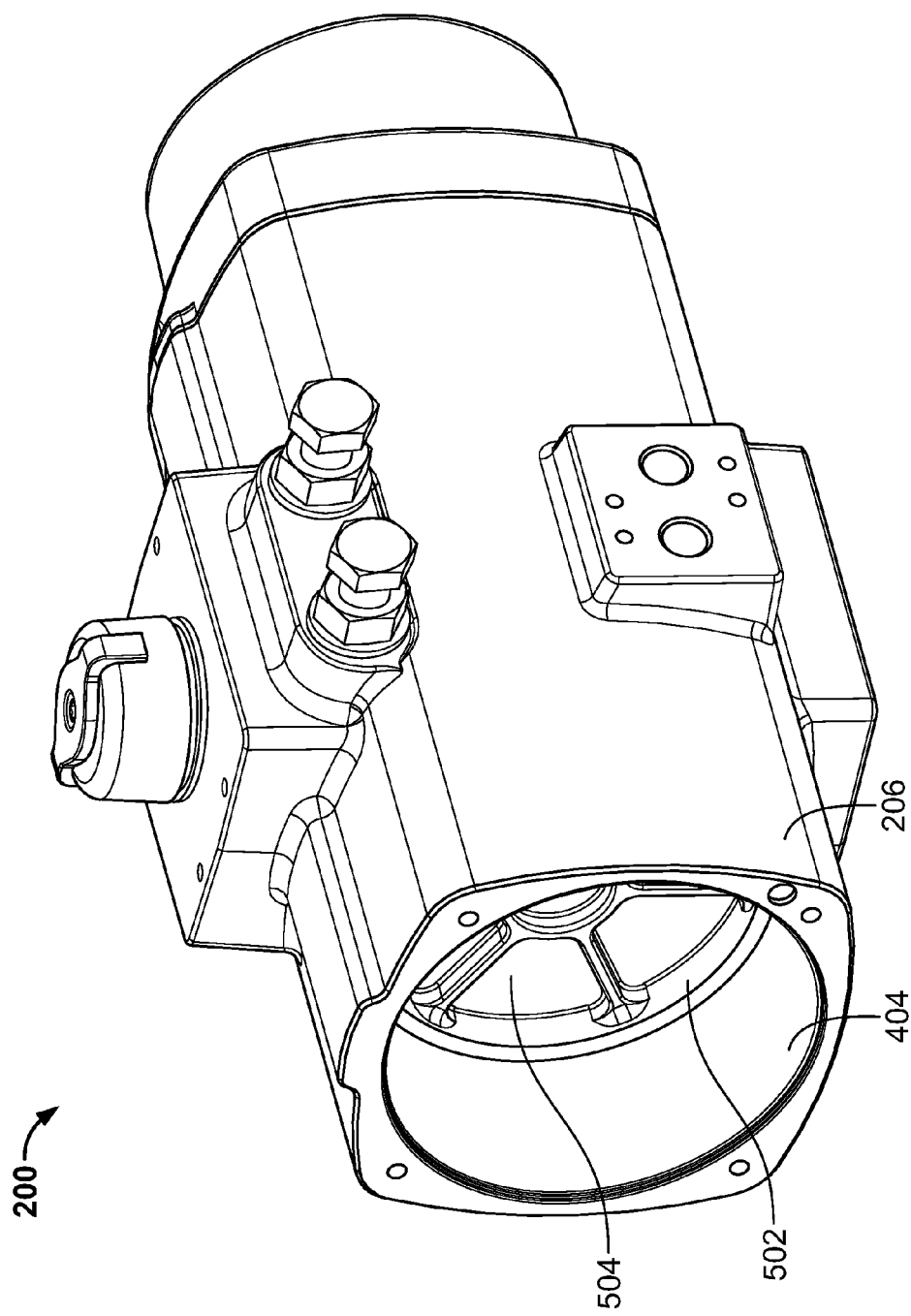
Figure 6:
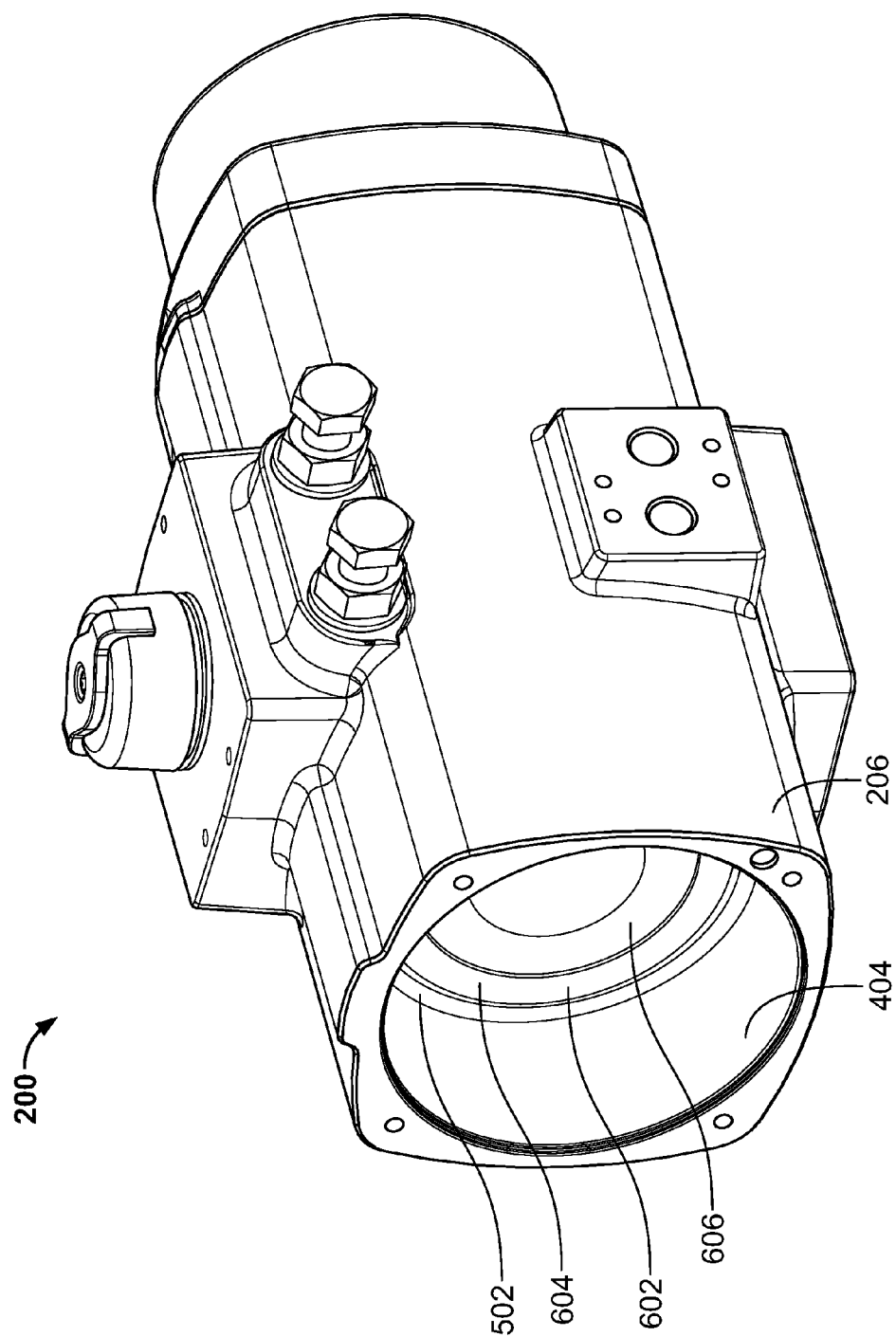

In examples in which the output torque is to be changed by positioning one or more spacers 602 immediately adjacent a piston 502 (FIG. 5) of the actuator 200, the spring assembly 402 is removed from the outer chamber 404 and the spacer 602 is then inserted into the outer chamber 404 such that projections 802 (FIG. 8) of the spacer 602 (FIG. 6) are received within recesses 504 (FIG. 5) of the piston 502 (FIG. 5). FIG. 5 shows the outer chamber 404 after removing the spring assembly 402 and FIG. 6 shows the outer chamber 404 after the spacer 602 is positioned therein.

Figure 7:
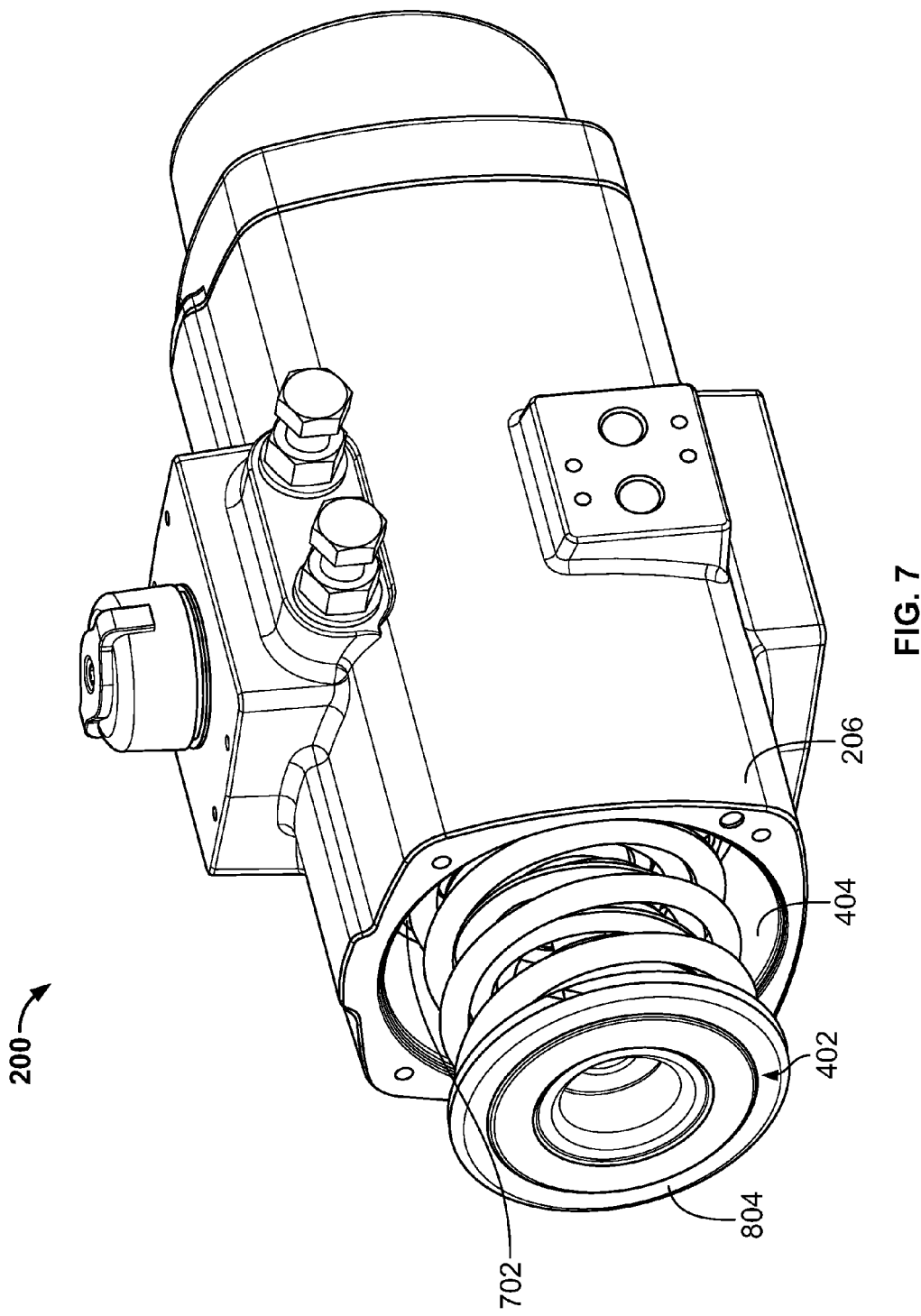
Figure 8:
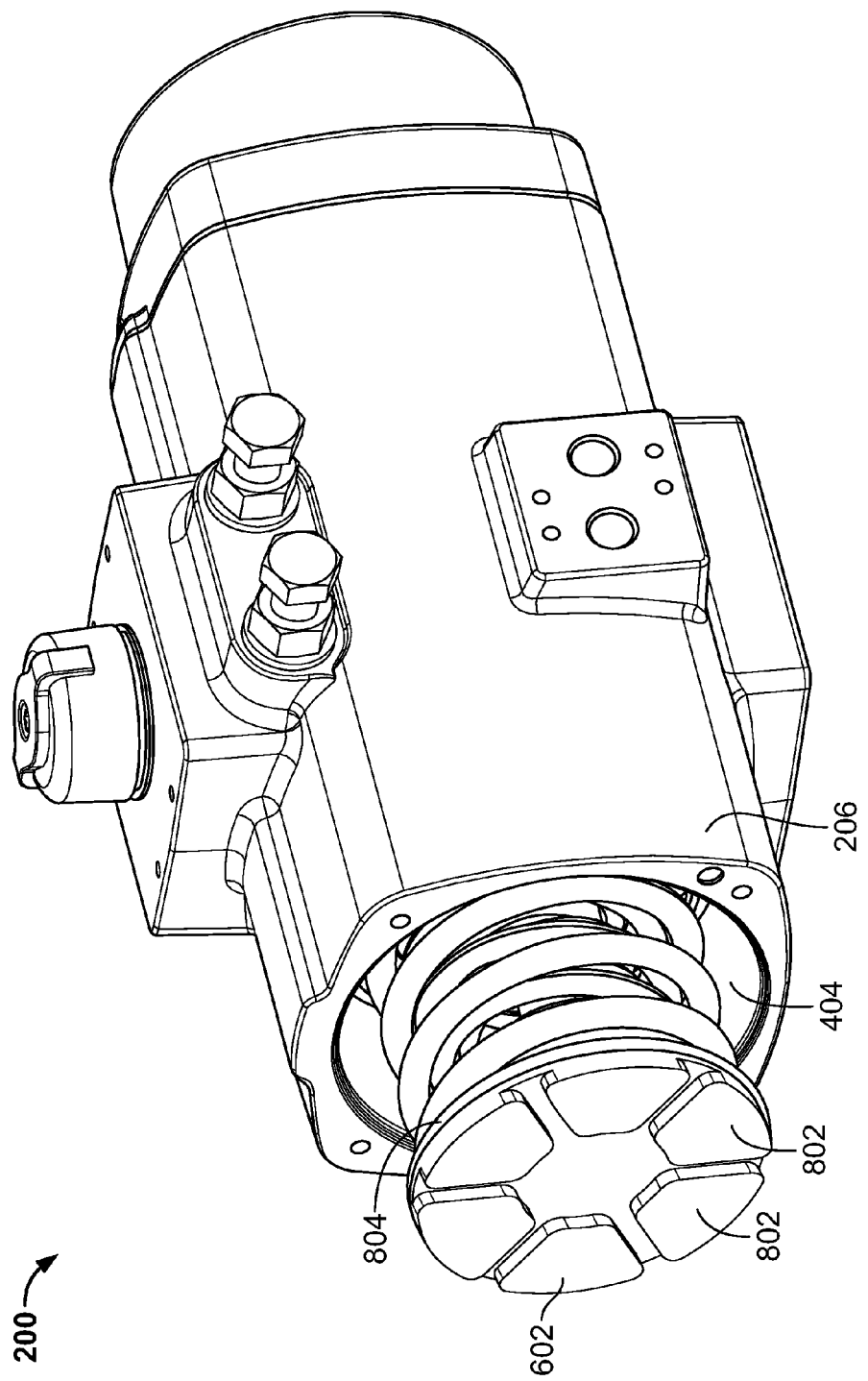

The spring assembly 402 may then be re-positioned and/or inserted within the outer chamber 404 such that a first plate 702 (FIG. 7) of the spring assembly 402 is positioned immediately adjacent a second side 604 (FIG. 6) of the spacer 602. In some examples, the second side 604 (FIG. 6) of the spacer 602 has an annular groove 606 (FIG. 6) that matingly engages a corresponding projection 1402 (FIG. 14) of the first plate 702. FIG. 7 shows the actuator 200 with the spring assembly 402 repositioned in the outer chamber 404 and the spacer 602 (FIG. 6) positioned between the piston 502 (FIG. 5) and the first plate 702 (FIG. 7). As shown in FIG. 8, another spacer 602 may be positioned within the actuator 200 adjacent a second plate 804 such that the spacers 602 face in opposing directions.

Figure 9:
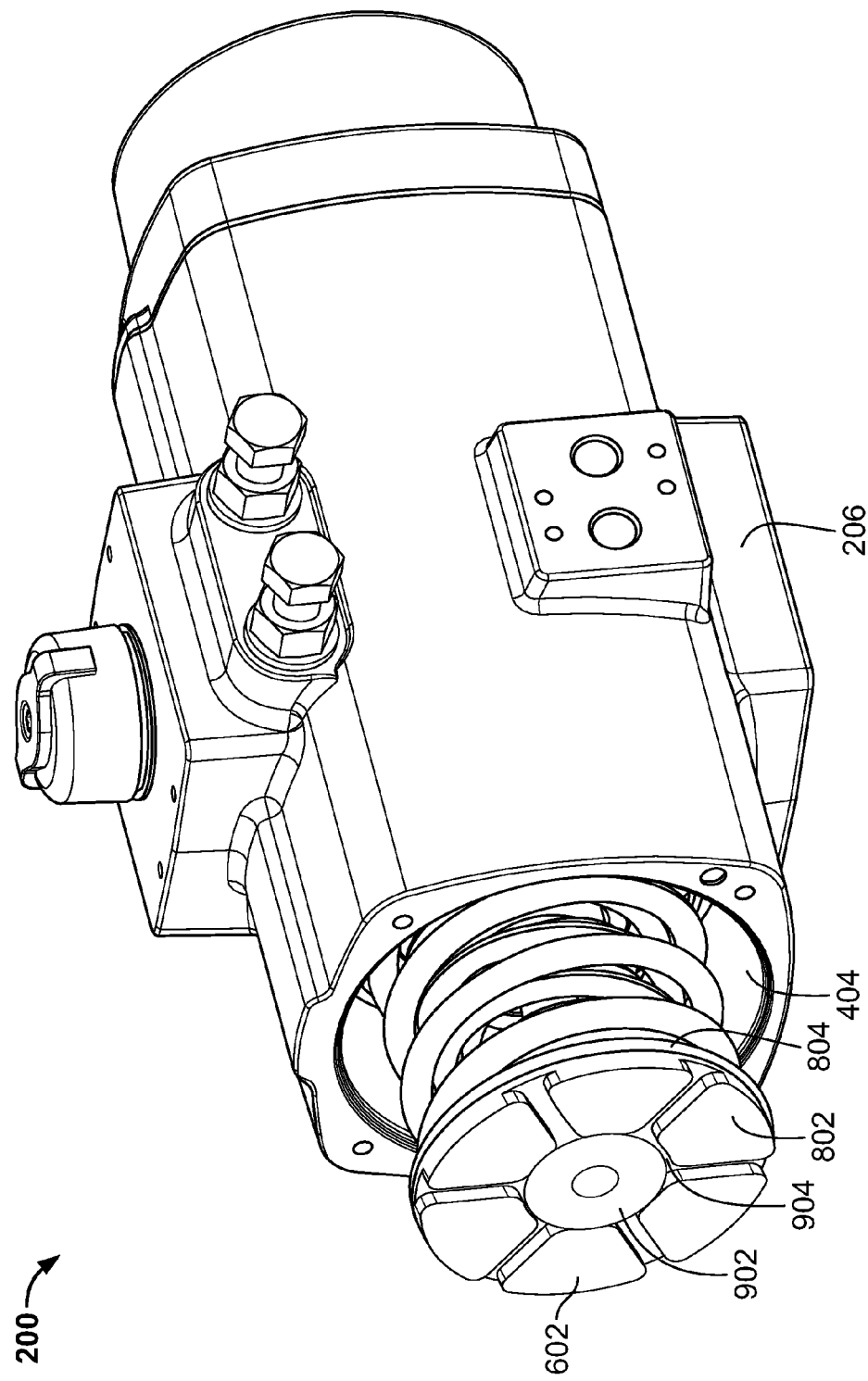

FIG. 9 shows an insert 902 positioned within an aperture 904 of the spacer 602. The end cap 204 may then be recoupled to the body 206 using the fasteners 203. Positioning the spacers 602 within the actuator 200 causes the available space for the spring assembly 402 to decrease, the distance between the plates 702, 804 to decrease and the output torque of the actuator 200 to increase. In examples in which a lower spring output torque is desired, one spacer 602 may be positioned within the actuator 200. In other examples, spacers 602 of varying thickness may be used. In examples in which a higher spring output torque is desired, more than two spacers 602 of similar or different thicknesses may be used.

While the above example describes positioning two spacers 602 within a first side 208 (FIG. 2) of the actuator 200, two spacers 602 may also be positioned on a second side 210 (FIG. 2) of the actuator 200. While the above example describes using two spacers 602 to change the spring torque output of the actuator 200, any other number of spacers 602 (e.g., 1, 3, 4, 5, 6, etc.) may be positioned within the actuator 200. For example, six spacers 602 may be positioned within the first side 208 of the actuator 200 and six spacers 602 may be positioned within the second side 210 of the actuator 200.

Figure 13:
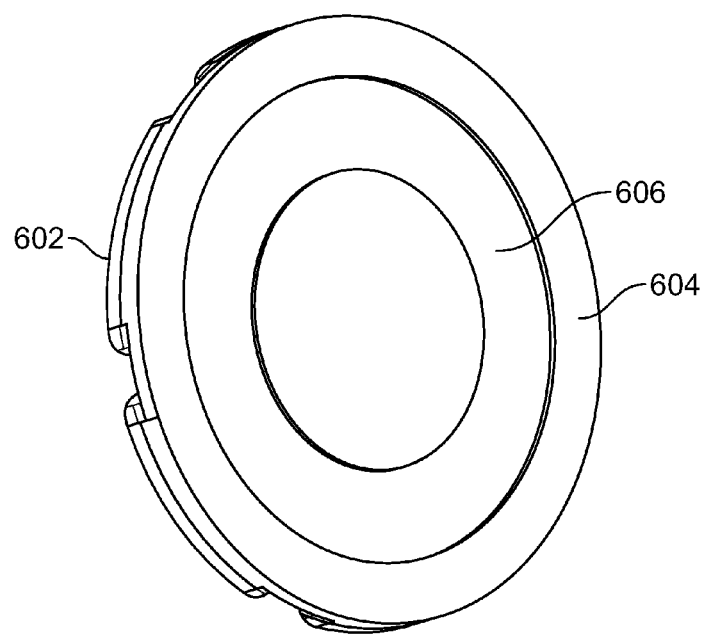
FIG. 13 depicts another isometric view of the example spacer that can be used to implement the examples disclosed herein.
Figure 14:
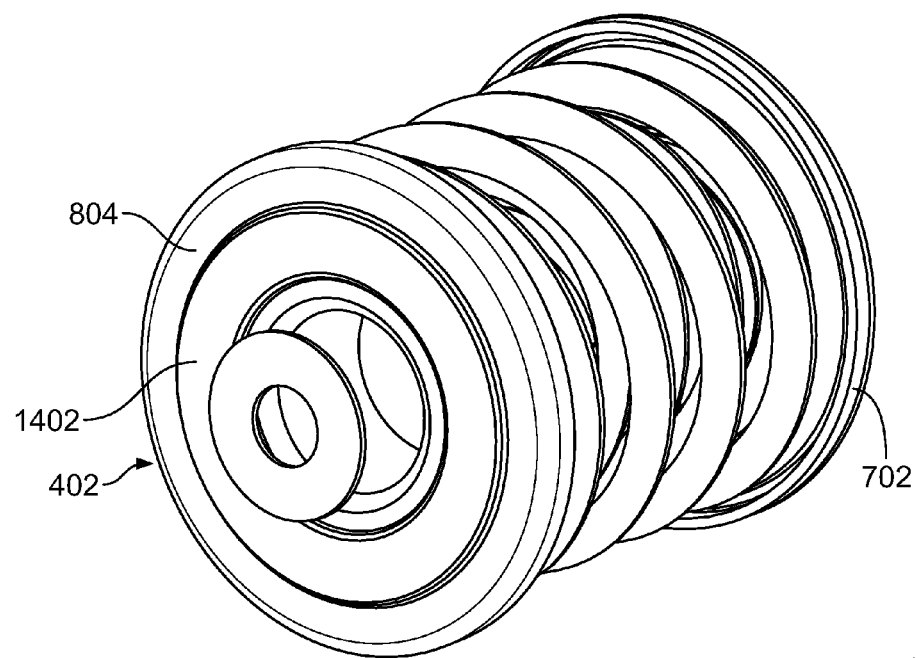
FIG. 14 depicts an example spring assembly that can be used to implement the examples disclosed herein.

FIG. 10 shows a first side 1002 of the spacer 602 having the projections 802, the aperture 904 and grooves 1004 separating the projections 802. In this example, the projections 802 are trapazoidally-shaped having one or more curved surfaces. FIG. 11 shows a chamber 1102 of the end cap 204 that defines recesses 1104 and ribs 1106. The recesses 1104 of the end cap 204 correspond to and/or receive the projections 802 of the spacer 602 and the grooves 1004 of the spacer 602 correspond to and/or receive the ribs 1106. In some examples, the end cap 204 defines an aperture 1108 that receives a portion of the insert 902. FIG. 12 shows the piston 502 having the recesses 504 and ribs 1202. The recesses 504 of the piston 502 correspond to and/or receive the projections 802 of the spacer 602 and the grooves 1004 of the spacer 602 correspond to and/or receive the ribs 1202. In examples in which the spring assembly 402 is not positioned within the outer chamber 404, a plurality of springs may be positioned within the outer chamber 404 that extend between the piston 502 and the end cap 204. In such examples, the ends of the springs may be received and/or seated within the recesses 504, 1104 of the piston 502, and the end cap 204. FIG. 13 shows the second side 604 of the spacer 602 defining the annular groove 606 and FIG. 14 shows the second plate 804 having the projection 1402 to be received within the annular groove 606 of the spacer 602.

Figure 15:
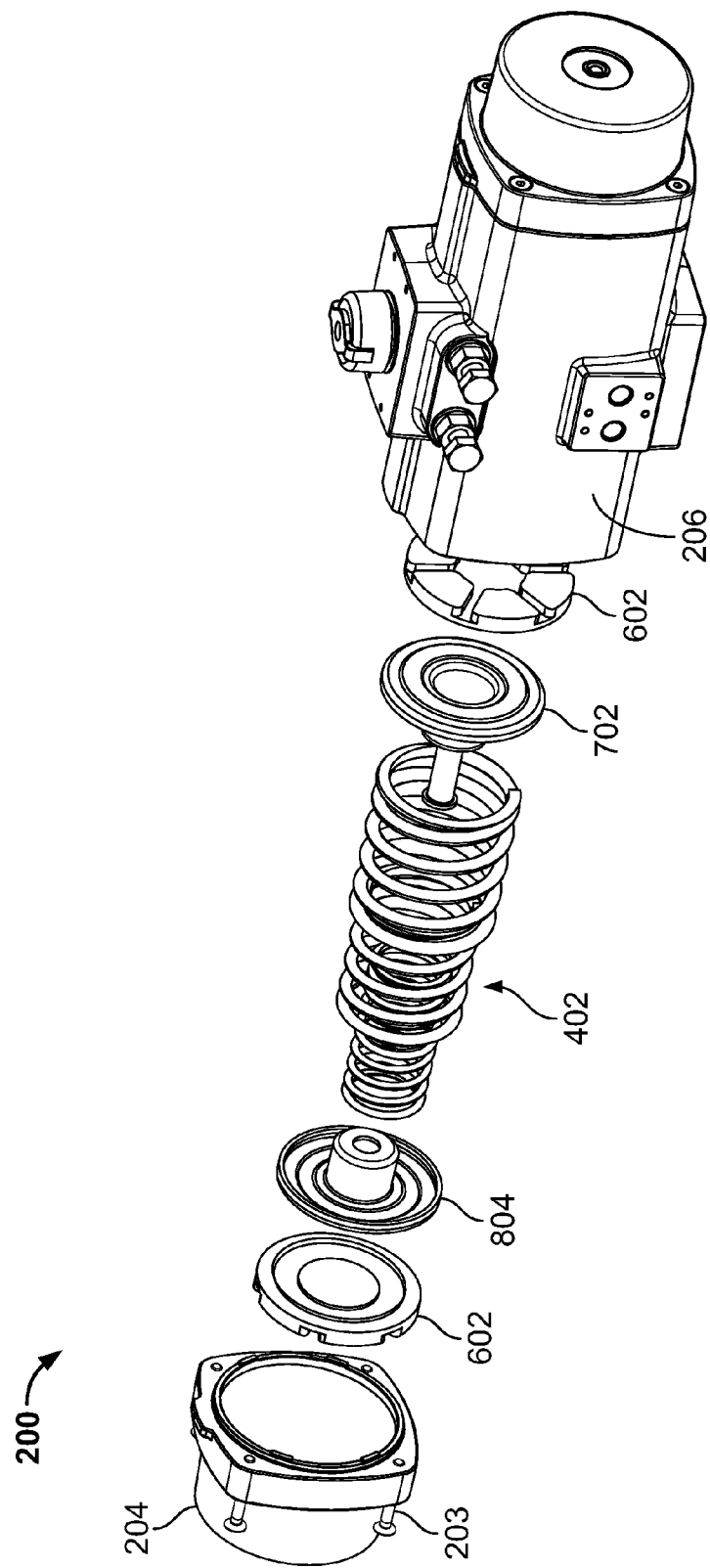
FIG. 15 depicts a partial exploded view of the rotary actuator of FIG. 2.
Figure 16:
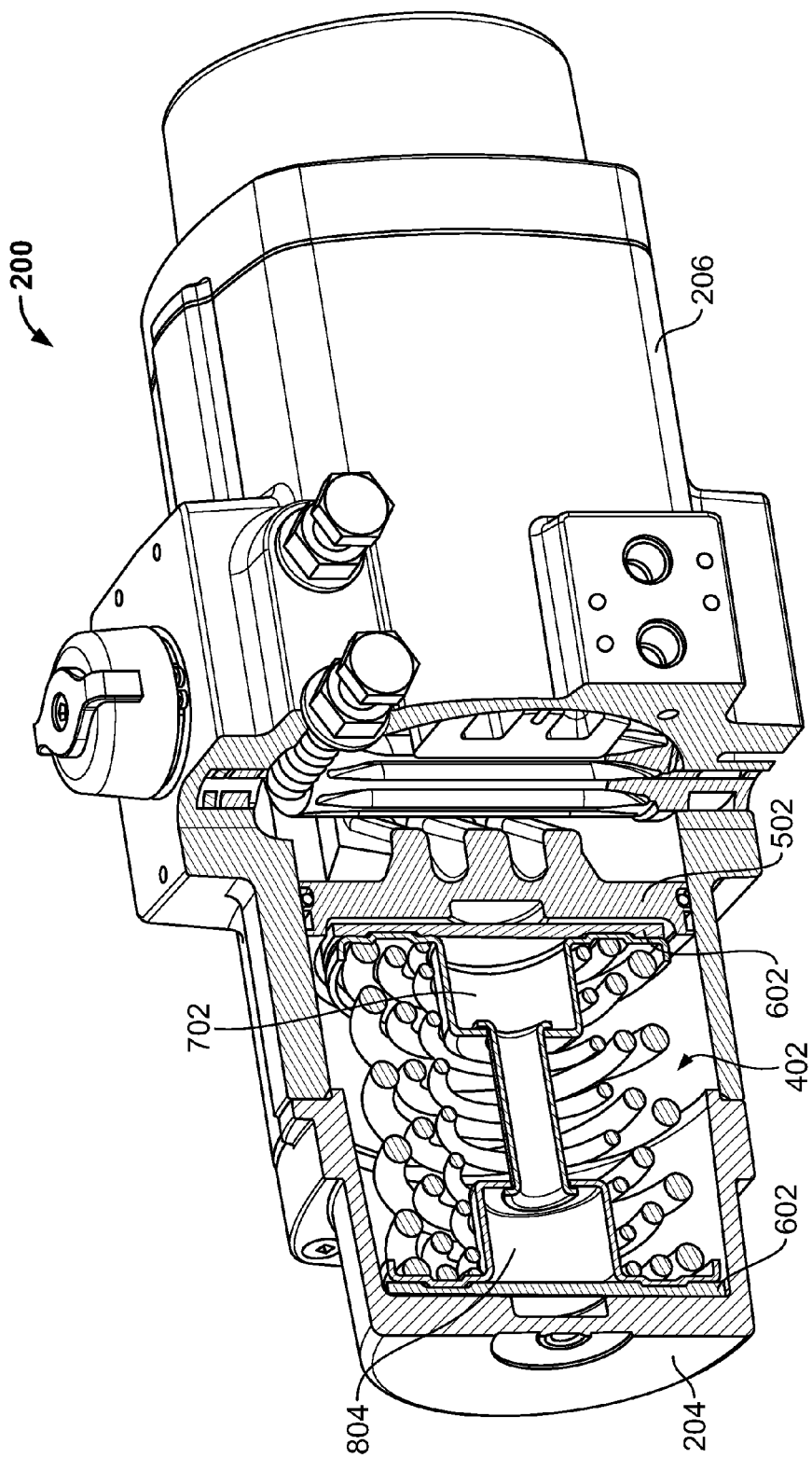
FIG. 16 depicts a partial cut-away view of the rotary actuator in a first position showing two example spacers positioned within the actuator.
Figure 17:
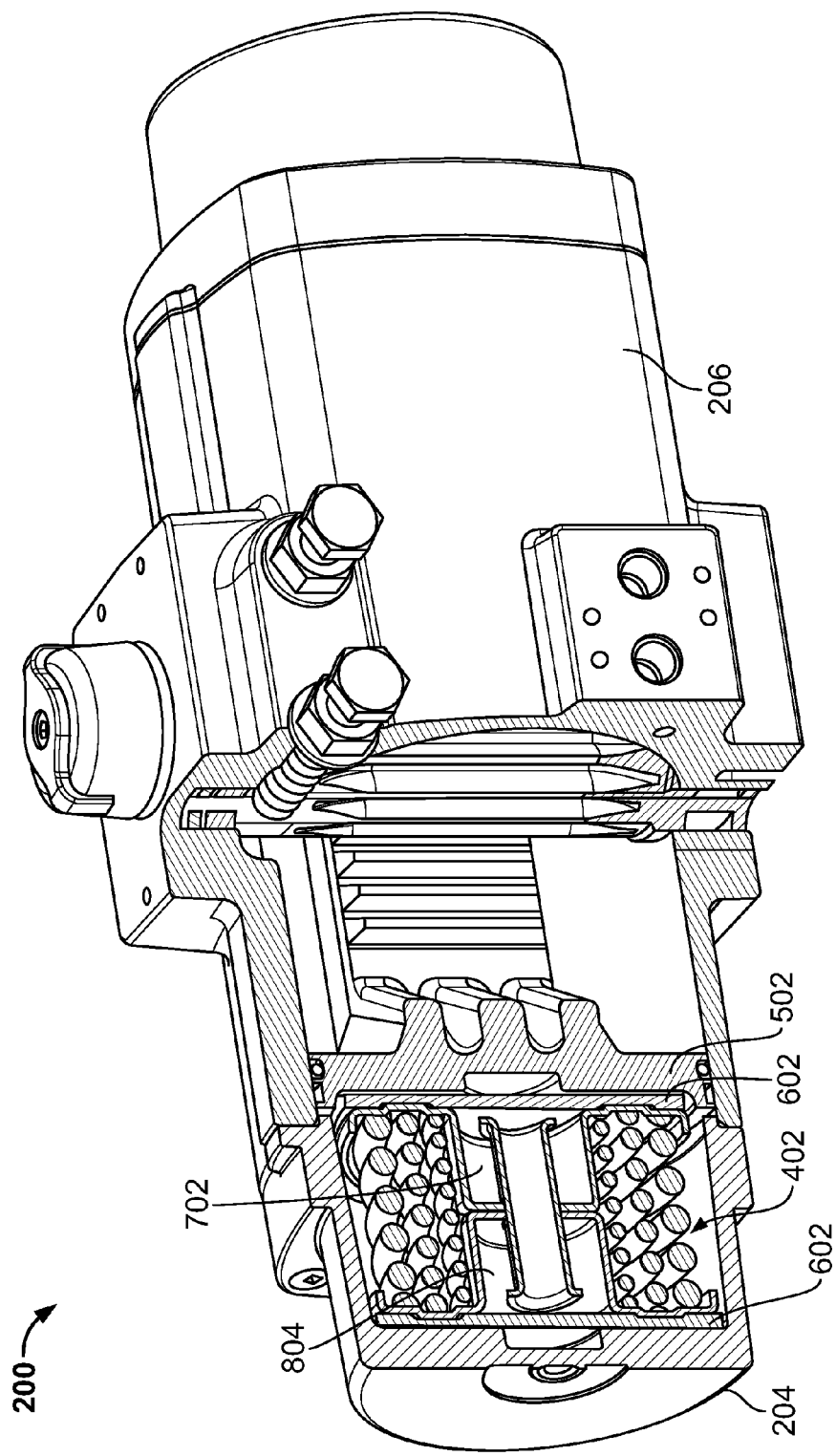
FIG. 17 depicts a partial cut-away view of the rotary actuator in a second position showing two example spacers positioned within the actuator.
Figure 18:
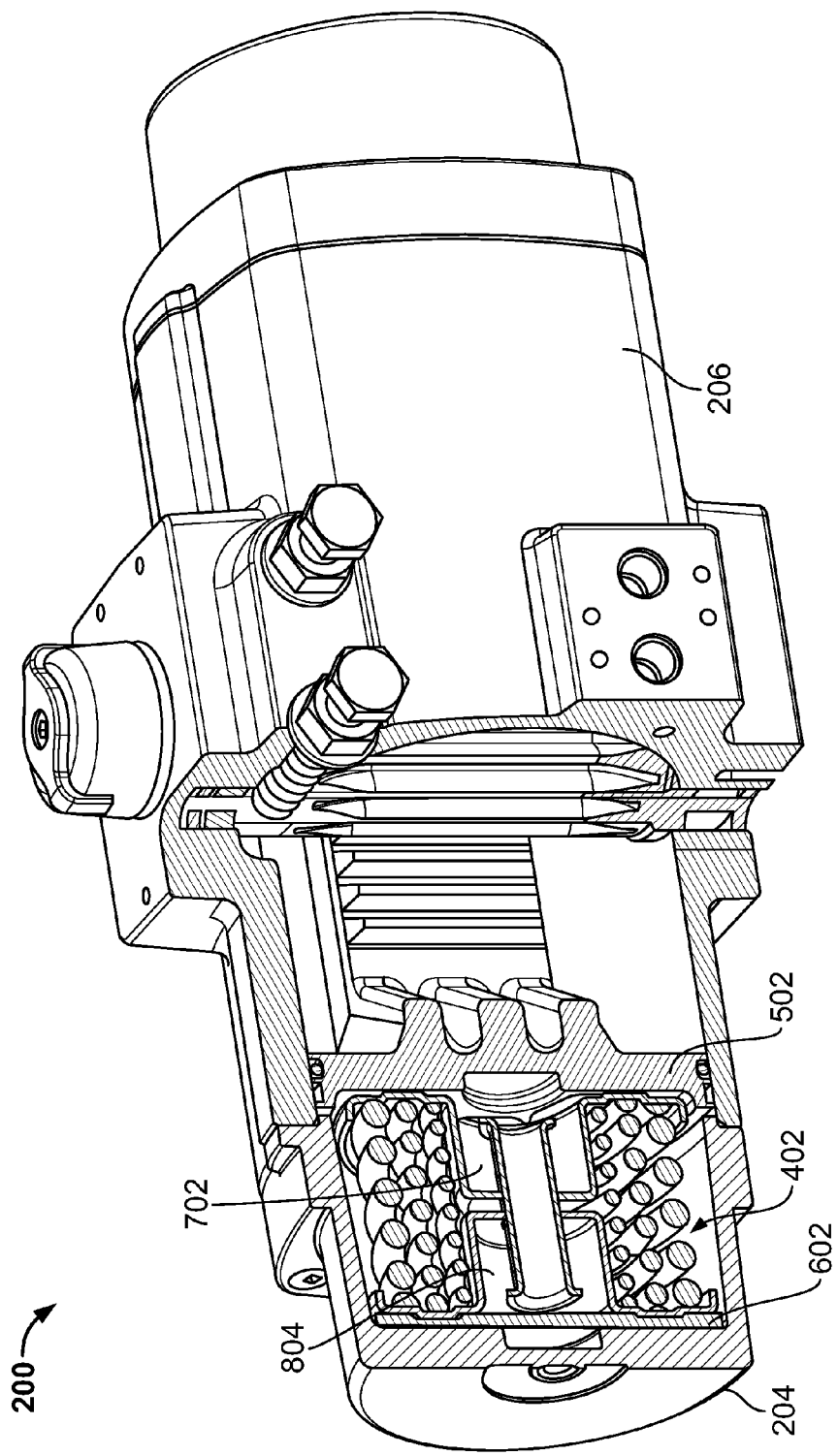
FIG. 18 depicts a partial cut-away view of the rotary actuator in the first position showing one example spacer positioned within the actuator.

FIG. 15 shows a partial exploded view of the actuator 200. FIG. 16 shows a partial cross-sectional view of the actuator 200 in a first position (e.g., a closed position) and FIG. 17 shows the partial cross-sectional view of the actuator 200 in a second position (e.g., an open position). FIG. 18 depicts the actuator 200 showing one spacer 602 positioned within the outer chamber 604 instead of showing two spacers 602. While the spacer 602 of FIG. 18 is shown as being adjacent the end cap 204, the spacer 602 may be positioned adjacent the piston 502 instead.

As set forth herein, an example method includes decoupling a first end cap from a body of an actuator. A first spring assembly is positioned within a first outer chamber defined by the first end cap and the body. A first end of the first spring assembly is positioned adjacent a surface of a first piston. A second end of the first spring assembly is positioned adjacent the first end cap when the first end cap is coupled to the body. The method includes positioning a first spacer within the first outer chamber and coupling the first end cap to the body. The first spacer changes a distance between the first and second ends of the first spring assembly when the first end cap is coupled to the body to change an output torque of the actuator.

In some examples, positioning the first spacer within the first outer chamber includes removing the first spring assembly from the first outer chamber and positioning the first spring assembly within the first outer chamber. A first surface of the first spacer is positioned adjacent the surface of the first piston. The first end of the first spring assembly is positioned adjacent a second surface of the first spacer. The first surface of the first spacer is opposite the second surface of the first spacer.

In some examples, the surface of the piston includes recesses and the first surface of the first spacer includes raised areas that are received in the recesses to substantially prevent rotation of the first spacer relative to the piston. In some examples, positioning the first spacer within the first outer chamber includes positioning the first spacer adjacent the second end of the first spring assembly. In some examples, the second end of the first spring assembly includes a groove and the first surface of the first spacer includes a projection to be received within the groove to enable the spring assembly to rotate relative to the first spacer.

In some examples, the method includes, prior to coupling the first end cap to the body, positioning a second spacer within the first outer chamber. In some examples, the method includes decoupling a second end cap from the body. The second end cap is positioned opposite the first end cap when the end caps are coupled to the body. A second spring assembly is positioned within a second outer chamber defined by the second end cap and the body. A third end of the second spring assembly is positioned adjacent a surface of a second piston. The first piston is positioned opposite the second piston. A fourth end of the second spring assembly is positioned adjacent the second end cap when the second end cap is coupled to the body. The method also includes positioning a second spacer within the second outer chamber and coupling the second end cap to the body. The second spacer changes a distance between the third and fourth ends of the second spring assembly when the second end cap is coupled to the body to change an output torque of the actuator.

In some examples, positioning the second spacer within the second outer chamber includes removing the second spring assembly from the second outer chamber, a third surface of the second spacer is positioned adjacent the surface of the second piston and positioning the second spring assembly within the second outer chamber. The third end of the second spring assembly is positioned adjacent a fourth surface of the second spacer. The third surface of the second spacer is opposite the fourth surface of the second spacer. In some examples, positioning the second spacer within the second outer chamber includes positioning the second spacer adjacent the third end of the second spring assembly. In some examples, the method includes, prior to coupling the second end cap to the body, positioning a third spacer within the second outer chamber.

Another example method includes positioning a first spacer within a first outer chamber and positioning a first spring assembly within the first outer chamber. The first outer chamber is defined by a first end cap and a body of an actuator. A first end of the first spring assembly is positioned adjacent a surface of a first piston. A second end of the first spring assembly is positioned adjacent the first end cap when the first end cap is coupled to the body. The method includes coupling the first end cap to the body. The first spacer changes a distance between the first and second ends of the first spring assembly when the first end cap is coupled to the body to change an output torque of the actuator.

In some examples, positioning the first spacer within the first outer chamber includes positioning the first spacer between the first end of the spring assembly and the first piston. In some examples, positioning the first spacer within the first outer chamber includes positioning projections of the first spacer within recesses of the piston to substantially prevent rotational movement of the first spacer relative to the piston. The first spacer is positioned between the first end of the spring assembly and the first piston. In some examples, positioning the first spacer within the first outer chamber includes positioning the first spacer between the second end of the first spring assembly and the first end cap. In some examples, positioning the first spacer within the first outer chamber includes positioning projections of the first spacer within recesses of the end cap to substantially prevent rotational movement of the first spacer relative to the end cap. The first spacer is positioned between the second end of the spring assembly and the first end cap. In some examples, the method includes, prior to coupling the first end cap to the body, positioning a second spacer within the first outer chamber.

In some examples, the method includes positioning a second spacer within a second outer chamber, positioning a second spring assembly within the second outer chamber. The second outer chamber is defined by a second end cap and the body. A third end of the second spring assembly is positioned adjacent a surface of a second piston. A fourth end of the second spring assembly is positioned adjacent the second end cap when the second end cap is coupled to the body. The method includes coupling the second end cap to the body. The second spacer changes a distance between the third and fourth ends of the second spring assembly when the second end cap is coupled to the body to change an output torque of the actuator. In some examples, positioning the second spacer within the second outer chamber includes positioning the second spacer between the third end of the spring assembly and the second piston. In some examples, positioning the second spacer within the second outer chamber includes positioning the second spacer between the fourth end of the second spring assembly and the second end cap.

An example apparatus includes a housing of an actuator including a chamber, an end cap to be coupled to an end of the housing, a piston to slidably engage a surface of the chamber, a biasing apparatus to be positioned within the chamber to bias the piston. The biasing apparatus has a first end, a second end, and a spring positioned between the first and second ends to urge the first end away from the second end. The apparatus includes means for changing a distance between the first and second ends of the biasing apparatus when the end cap is coupled to the body to change an output torque of the actuator. In some examples, the means for changing a distance between the first and second ends is the spacer as disclosed herein.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method, comprising:
 decoupling a first end cap from a body of an actuator, a first spring assembly being positioned within a first outer chamber defined by the first end cap and the body, a first end of the first spring assembly being positioned adjacent a surface of a first piston, a second end of the first spring assembly being positioned adjacent the first end cap when the first end cap is coupled to the body;
 positioning a first spacer within the first outer chamber; and
 coupling the first end cap to the body, the first spacer changing a distance between the first and second ends of the first spring assembly when the first end cap is coupled to the body to change an output torque of the actuator, the positioning of the first spacer within the first outer chamber comprises: removing the first spring assembly from the first outer chamber, a first surface of the first spacer being positioned adjacent the surface of the first piston; and positioning the first spring assembly within the first outer chamber, the first end of the first spring assembly being positioned adjacent a second surface of the first spacer, the first surface of the first spacer being opposite the second surface of the first spacer, the surface of the piston comprises recesses and the first surface of the first spacer comprises raised areas that are received in the recesses to substantially prevent rotation of the first spacer relative to the piston.

2. The method of claim 1, further including positioning a second spacer within the first outer chamber comprising positioning the second spacer adjacent the second end of the first spring assembly.

3. The method of claim 1, further comprising, prior to coupling the first end cap to the body, positioning a second spacer within the first outer chamber.

4. The method of claim 1, further comprising:
decoupling a second end cap from the body, the second end cap being positioned opposite the first end cap when the end caps are coupled to the body, a second spring assembly being positioned within a second outer chamber defined by the second end cap and the body, a third end of the second spring assembly being positioned adjacent a surface of a second piston, the first piston being positioned opposite the second piston, a fourth end of the second spring assembly being positioned adjacent the second end cap when the second end cap is coupled to the body;
positioning a second spacer within the second outer chamber; and
coupling the second end cap to the body, the second spacer changing a distance between the third and fourth ends of the second spring assembly when the second end cap is coupled to the body to change an output torque of the actuator.

5. The method of claim 4, wherein the positioning of the second spacer within the second outer chamber comprises:
removing the second spring assembly from the second outer chamber, a third surface of the second spacer being positioned adjacent the surface of the second piston; and
positioning the second spring assembly within the second outer chamber, the third end of the second spring assembly being positioned adjacent a fourth surface of the second spacer, the third surface of the second spacer being opposite the fourth surface of the second spacer.

6. The method of claim 4, wherein the positioning of the second spacer within the second outer chamber comprises positioning the second spacer adjacent the third end of the second spring assembly.

7. The method of claim 4, further comprising, prior to coupling the second end cap to the body, positioning a third spacer within the second outer chamber.

8. A method, comprising:
decoupling a first end cap from a body of an actuator, a first spring assembly being positioned within a first outer chamber defined by the first end cap and the body, a first end of the first spring assembly being positioned adjacent a surface of a first piston, a second end of the first spring assembly being positioned adjacent the first end cap when the first end cap is coupled to the body;
positioning a first spacer within the first outer chamber; and
coupling the first end cap to the body, the first spacer changing a distance between the first and second ends of the first spring assembly when the first end cap is coupled to the body to change an output torque of the actuator, the positioning of the first spacer within the first outer chamber includes positioning the first spacer adjacent the second end of the first spring assembly, the second end of the first spring assembly comprises a groove and the first surface of the first spacer comprises a projection to be received within the groove to enable the spring assembly to rotate relative to the first spacer.

9. The method of claim 8, wherein the positioning of the first spacer within the first outer chamber comprises:
removing the first spring assembly from the first outer chamber, a first surface of the first spacer being positioned adjacent the surface of the first piston; and
positioning the first spring assembly within the first outer chamber, the first end of the first spring assembly being positioned adjacent a second surface of the first spacer, the first surface of the first spacer being opposite the second surface of the first spacer.

10. The method of claim 8, further comprising, prior to coupling the first end cap to the body, positioning a second spacer within the first outer chamber.

11. The method of claim 8, further comprising:
decoupling a second end cap from the body, the second end cap being positioned opposite the first end cap when the end caps are coupled to the body, a second spring assembly being positioned within a second outer chamber defined by the second end cap and the body, a third end of the second spring assembly being positioned adjacent a surface of a second piston, the first piston being positioned opposite the second piston, a fourth end of the second spring assembly being positioned adjacent the second end cap when the second end cap is coupled to the body;
positioning a second spacer within the second outer chamber; and
coupling the second end cap to the body, the second spacer changing a distance between the third and fourth ends of the second spring assembly when the second end cap is coupled to the body to change an output torque of the actuator.

12. The method of claim 11, wherein the positioning of the second spacer within the second outer chamber comprises:
removing the second spring assembly from the second outer chamber, a third surface of the second spacer being positioned adjacent the surface of the second piston; and
positioning the second spring assembly within the second outer chamber, the third end of the second spring assembly being positioned adjacent a fourth surface of the second spacer, the third surface of the second spacer being opposite the fourth surface of the second spacer.

13. The method of claim 11, further including positioning a third spacer within the second outer chamber comprising positioning the third spacer adjacent the fourth end of the second spring assembly.

14. The method of claim 8, further comprising, prior to coupling the second end cap to the body, positioning a third spacer within the second outer chamber.

15. The method of claim 8, further including positioning a second spacer within the first outer chamber comprising positioning the second spacer adjacent the first end of the first spring assembly.

16. A method, comprising:
positioning a first spacer within a first outer chamber;
positioning a first spring assembly within the first outer chamber, the first outer chamber defined by a first end cap and a body of an actuator, a first end of the first spring assembly being positioned adjacent a surface of a first piston, a second end of the first spring assembly being positioned adjacent the first end cap when the first end cap is coupled to the body; and
coupling the first end cap to the body, the first spacer changing a distance between the first and second ends of the first spring assembly when the first end cap is coupled to the body to change an output torque of the actuator, the positioning of the first spacer within the first outer chamber comprises positioning projections of the first spacer within recesses of the piston to substantially prevent rotational movement of the first spacer relative to the piston, the first spacer being positioned between the first end of the spring assembly and the first piston.

17. The method of claim 16, wherein the positioning of the first spacer within the first outer chamber comprises positioning the first spacer between the first end of the spring assembly and the first piston.

18. The method of claim 16, further including positioning a second spacer within the first outer chamber comprising positioning the second spacer between the second end of the first spring assembly and the first end cap.

19. The method of claim 16, further comprising, prior to coupling the first end cap to the body, positioning a second spacer within the first outer chamber.

20. The method of claim 16, further comprising
positioning a second spacer within a second outer chamber;
positioning a second spring assembly within the second outer chamber, the second outer chamber defined by a second end cap and the body, a third end of the second spring assembly being positioned adjacent a surface of a second piston, a fourth end of the second spring assembly being positioned adjacent the second end cap when the second end cap is coupled to the body; and
coupling the second end cap to the body, the second spacer changing a distance between the third and fourth ends of the second spring assembly when the second end cap is coupled to the body to change an output torque of the actuator.

21. The method of claim 20, wherein the positioning of the second spacer within the second outer chamber comprises positioning the second spacer between the third end of the spring assembly and the second piston.

22. The method of claim 20, wherein the positioning of the second spacer within the second outer chamber comprises positioning the second spacer between the fourth end of the second spring assembly and the second end cap.

23. A method, comprising:
decoupling a first end cap from a body of an actuator, a first spring assembly being positioned within a first outer chamber defined by the first end cap and the body, a first end of the first spring assembly being positioned adjacent a surface of a first piston, a second end of the first spring assembly being positioned adjacent the first end cap when the first end cap is coupled to the body;
positioning a first spacer within the first outer chamber; and
coupling the first end cap to the body, the first spacer changing a distance between the first and second ends of the first spring assembly when the first end cap is coupled to the body to change an output torque of the actuator, the positioning of the first spacer within the first outer chamber comprises positioning projections of the first spacer within recesses of the end cap to substantially prevent rotational movement of the first spacer relative to the end cap, the first spacer being positioned between the second end of the spring assembly and the first end cap.

24. The method of claim 23, further comprising, prior to coupling the first end cap to the body, positioning a second spacer within the first outer chamber.

25. The method of claim 23, further comprising
positioning a second spacer within a second outer chamber;
positioning a second spring assembly within the second outer chamber, the second outer chamber defined by a second end cap and the body, a third end of the second spring assembly being positioned adjacent a surface of a second piston, a fourth end of the second spring assembly being positioned adjacent the second end cap when the second end cap is coupled to the body; and
coupling the second end cap to the body, the second spacer changing a distance between the third and fourth ends of the second spring assembly when the second end cap is coupled to the body to change an output torque of the actuator.

26. The method of claim 25, wherein positioning the second spacer within the second outer chamber comprises positioning the second spacer between the third end of the spring assembly and the second piston.

27. The method of claim 25, wherein positioning the second spacer within the second outer chamber comprises positioning the second spacer between the fourth end of the second spring assembly and the second end cap.

\* \* \* \* \*